United States Patent
Kim et al.

(10) Patent No.: US 9,113,418 B2
(45) Date of Patent: Aug. 18, 2015

(54) TERMINAL DEVICE AND METHOD FOR CONTROLLING UPLINK TRANSMISSION POWER FOR INITIAL DATA TRANSMISSION AFTER NETWORK ENTRY IN A WIRELESS COMMUNICATION SYSTEM

(75) Inventors: Dongcheol Kim, Anyang-si (KR); Hangyu Cho, Anyang-si (KR); Wookbong Lee, Anyang-si (KR); Hyunwoo Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 273 days.

(21) Appl. No.: 13/810,176

(22) PCT Filed: Jul. 14, 2011

(86) PCT No.: PCT/KR2011/005207
§ 371 (c)(1),
(2), (4) Date: Jan. 14, 2013

(87) PCT Pub. No.: WO2012/008786
PCT Pub. Date: Jan. 19, 2012

(65) Prior Publication Data
US 2013/0116002 A1 May 9, 2013

Related U.S. Application Data

(60) Provisional application No. 61/364,027, filed on Jul. 14, 2010.

(51) Int. Cl.
*H04W 52/14* (2009.01)
*H04W 52/04* (2009.01)
*H04W 52/36* (2009.01)
*H04W 52/50* (2009.01)

(52) U.S. Cl.
CPC .......... *H04W 52/04* (2013.01); *H04W 52/146* (2013.01); *H04W 52/362* (2013.01); *H04W 52/50* (2013.01)

(58) Field of Classification Search
CPC ... H04W 52/04; H04W 52/50; H04W 52/146; H04W 52/362
USPC .............................................. 455/69; 370/318
See application file for complete search history.

(56) References Cited

U.S. PATENT DOCUMENTS

2012/0157150 A1* 6/2012 Yang et al. ..................... 455/522

FOREIGN PATENT DOCUMENTS

| KR | 10-2001-0108386 | 12/2001 |
| KR | 10-2002-0003526 | 1/2002 |
| KR | 10-2005-0007980 | 1/2005 |
| KR | 10-2008-0102175 | 11/2008 |

OTHER PUBLICATIONS

PCT International Application No. PCT/KR2011/005207, Written Opinion of the International Searching Authority dated Mar. 23, 2012, 18 pages.

* cited by examiner

*Primary Examiner* — Raymond Dean
(74) *Attorney, Agent, or Firm* — Lee, Hong, Degerman, Kang & Waimey (57) ABSTRACT

A method and device for controlling an uplink transmission power by a mobile station in a wireless communication system. The method includes: determining, by the mobile station after successfully completing an initial ranging process, an initial offset value using a final initial ranging transmission power and a number of initial ranging subcarriers; and setting, by the mobile station, the initial offset value to an offset value for an initial data transmission power.

15 Claims, 4 Drawing Sheets

(a) Format 0

(b) Format 1

FIG. 4

TERMINAL DEVICE AND METHOD FOR CONTROLLING UPLINK TRANSMISSION POWER FOR INITIAL DATA TRANSMISSION AFTER NETWORK ENTRY IN A WIRELESS COMMUNICATION SYSTEM

CROSS-REFERENCE TO RELATED APPLICATIONS

This application is the National Stage filing under 35 U.S.C. 371 of International Application No. PCT/KR2011/005207, filed on Jul. 14, 2011, which claims the benefit of U.S. Provisional Application Ser. No. 61/364,027, filed on Jul. 14, 2010, the contents of which are all hereby incorporated by reference herein in their entirety.

TECHNICAL FIELD

The following description relates to wireless communication, and more specifically, to a terminal device and method for controlling uplink transmission power for initial data transmission after network entry in a wireless communication system.

TECHNICAL FIELD

Background Art

A broadband wireless communication system is based on orthogonal frequency division multiplexing (OFDM) and orthogonal frequency division multiple access (OFDMA) and can perform high rate data transmission by transmitting a physical channel signal using a plurality of subcarriers.

It is necessary to synchronize a transmitter and a receiver with each other to receive and demodulate data in a wireless communication system. Particularly, in a wireless communication system in which a channel environment between a base station and a mobile station continuously varies, a base station and a mobile station need to be synchronized with each other through signaling for successful transmission and reception of data. Downlink transmission has no problems because a base station simultaneously transmits signals to a plurality of mobile stations at a reference timing on downlink, whereas the mobile stations respectively transmit signals on uplink, resulting in different propagation delays for the mobile stations. To solve this problem, a timing synchronization method is required, which is ranging. That is, ranging is a process through which a plurality of mobile stations adjusts synchronization of transmission time.

A plurality of mobile stations performs downlink synchronization with data frames transmitted from a base station. For synchronization of the mobile stations, the base station may insert a preamble for synchronization into some frames transmitted to the mobile stations. The mobile stations perform synchronization for a downlink channel through the preamble. Alternatively, the base station can use a separate synchronization channel. On uplink, each mobile station needs to transmit data to the base station through a time and/or frequency region allocated thereto in order to avoid interference between mobile stations and to allow the base station to receive the data. Accordingly, for uplink synchronization, it is necessary to adjust synchronization between the base station and each mobile station through signaling in consideration of channel environment of each mobile station.

Initial ranging is a process of obtaining a correct timing offset between a mobile station and a base station and initially adjusting transmission power. When the mobile station is powered on, the mobile station acquires downlink synchronization from a received downlink preamble signal. Then, the mobile station performs initial ranging to adjust an uplink timing offset and transmission power.

Periodic ranging is a process of periodically tracking the uplink timing offset and received signal strength after initial ranging. Bandwidth request ranging is a process through which a mobile station requests a base station to provide a bandwidth. Handover ranging is a process performed by a mobile station during handover to perform synchronization with a base station other than the base station to which the mobile station currently belongs. Handover ranging is necessary for a moving mobile station to perform handover to a target base station. Handover ranging is identical to initial ranging except that the mobile station and the target base station may acquire non-contention initial ranging transmission opportunity to perform an administration message transmission/reception process for network entry/reentry. The mobile station can inform the target base station that the mobile station performs handover by inserting a serving base station ID and a ranging target indicator into a ranging request message. In this case, if the target base station cannot receive information of the mobile station in advance through a backbone, the target base station may request the serving base station to provide the information of the mobile station through the backbone.

The mobile station initially transmits data after successful initial ranging. The mobile station determines uplink transmission power for signal transmission. However, there has yet to be proposed a method for determining an uplink transmission power value used to transmit first data after successful initial ranging and a method for determining an initial offset parameter used to determine the uplink transmission power value.

DISCLOSURE

Technical Problem

An object of the present invention is to provide a method for controlling uplink transmission power for initial data transmission after network entry of a mobile station in a wireless communication network.

Another object of the present invention is to provide a mobile station device for controlling uplink transmission power for initial data transmission after network entry in a wireless communication network.

The technical problems solved by the present invention are not limited to the above technical problems and those skilled in the art may understand other technical problems from the following description.

Technical Solution

According to one aspect of the present invention, a method for controlling an uplink transmission power for an initial data transmission after a network entry of a mobile station in a wireless communication system includes: determining an initial offset value using a power value finally used for an initial ranging transmission and a number of initial ranging subcarriers; and determining an uplink transmission power value for the initial data transmission using the determined initial offset value. The method may further include transmitting initial data to a base station with the determined uplink transmission power value for the initial data transmission. The determining of the initial offset value may include determining the power value finally used for the initial ranging transmission, wherein the power value finally used for the initial ranging transmission is determined based on at least one of a power value initially used for the initial ranging transmission, a number of power ramp-up operations, a scale at which power ramp-up is performed, and a power level adjustment value resulting from a predetermined number of ranging response message receptions from the base station. The determining of the initial offset value may include determining the initial offset value using an initial ranging signal to interference plus noise ratio (SINR). The determining of the initial offset value may include determining the initial offset value using at least one of a value L corresponding to a transmit antenna gain and path loss of the mobile station and average noise and interference (NI) level per subcarrier, estimated by the base station. Here, the initial offset value may be calculated by equation A, the equation A is $$\text{Offset}_{Initial}=P_{TX\_IR\_Final}-(L+\text{SINR}_{InitialRanging}+\text{NI})-10\log 10(\text{RangingSubcarrierNum})$$

wherein $P_{TX\_IR\_Final}$ corresponds to a power value finally used for initial ranging transmission, RangingSubcarrierNum denotes the number of initial ranging subcarriers, and $\text{SINR}_{InitialRanging}$ denotes the initial ranging SINR. The power value finally used for initial ranging transmission may be represented as equation B, the equation B is $$P_{TX\_IR\_Final}=P_{TX\_IR\_MIN}+N\times P_{IR,Step}+\Sigma P_{RNG-ACK}(m)$$

wherein $P_{IR,Step}$ denotes the scale at which power ramp-up is performed, $P_{RNG-ACK}$ is a power level adjustment value of an m-th (m=1, 2, ..., M) RNG-ACK message received by the mobile station during ranging, and $P_{TX\_IR\_MIN}$ is a power value used for initial ranging transmission initially performed by the mobile station. The number of initial ranging subcarriers may be varied according to ranging channel type. The number of initial ranging subcarriers may be 139/2 or 139 when subcarrier spacing of a ranging channel corresponds to ½ of subcarrier spacing for data transmission and may be 557/2 or 557 when subcarrier spacing of a ranging channel corresponds to ⅛ of subcarrier spacing for data transmission. The initial offset value may be determined as 0 or a predetermined specific value when the number of initial ranging attempts exceeds a predetermined number.

According to another aspect of the present invention, a mobile station for controlling an uplink transmission power for an initial data transmission after a network entry in a wireless communication system includes a processor configured to determine an initial offset value using a power value finally used for an initial ranging transmission and a number of initial ranging subcarriers and to determine an uplink transmission power value for the initial data transmission using the determined initial offset value. The mobile station may further include a transmitter configured to transmit initial data to a base station with the determined uplink transmission power value for the initial data transmission. The processor may determine the power value finally used for the initial ranging transmission in order to determine the initial offset value, wherein the power value finally used for the initial ranging transmission is determined based on at least one of a power value initially used for the initial ranging transmission, a number of power ramp-up operations, a scale at which power ramp-up is performed, and a power level adjustment value resulting from a predetermined number of ranging response message receptions from the base station.

Advantageous Effects

According to embodiments of the present invention, the mobile station can effectively determine an uplink transmission power value used to transmit initial data after network entry on the basis of a power value finally used for initial ranging transmission.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, the following detailed description is given under the assumption that a mobile communication system conforming to Institute of Electrical and Electronics Engineers (IEEE) 802.16 and 3GPP (3rd Generation Partnership Project) is used. However, the description is applicable to any other mobile communication system except for specific features inherent to IEEE 802.16 and 3GPP.

In some instances, known structures and devices are omitted or are shown in block diagram form, focusing on important features of the structures and devices, so as not to obscure the concept of the invention. The same reference numbers will be used throughout this specification to refer to the same or like parts.

In the following description, the term terminal generically refers to a mobile or fixed user terminal device such as a User Equipment (UE), a Mobile Station (MS), an Advanced Mobile Station (AMS), a machine to machine (M2M) device, etc. In addition, the term Base Station (BS) generically refers to any node at a network end which communicates with a UE, such as a Node B, an evolved Node B (eNode B), an Access Point (AP), etc.

In a mobile communication system, an MS can receive information from a BS on downlink and transmit data to the BS on uplink. Information transmitted from or received at the MS includes data and various types of control information. There are many physical channels depending on the types and usages of information transmitted from or received at MSs.

Figure 1:
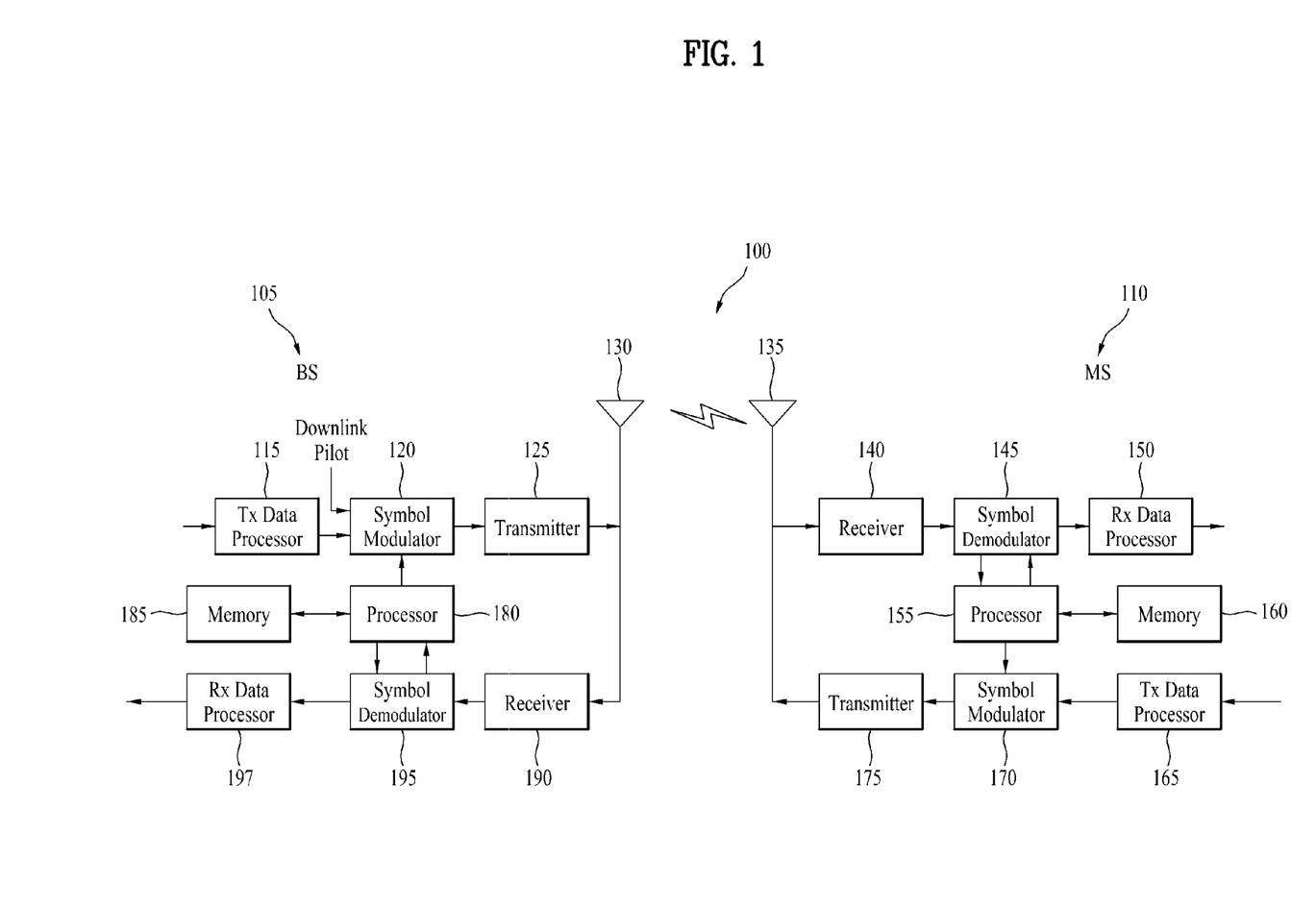
FIG. 1 is a block diagram showing configurations of a base station 105 and a mobile station 110 in a wireless communication system 100.

FIG. 1 is a block diagram showing configurations of a BS 105 and an MS 110 in a wireless communication system 100.

While one BS 105 and one MS 110 are shown in order to simplify illustration of the wireless communication system 100, the wireless communication system 100 can include one or more BSs and/or one or more MSs.

Referring to FIG. 1, the BS 105 may include a transmission (Tx) data processor 115, a symbol modulator 120, a transmitter 125, a transmit/receive antenna 130, a processor 180, a memory 185, a receiver 190, a symbol demodulator 195, and a reception (Rx) data processor 197. The MS 110 may include a Tx data processor 165, a symbol modulator 170, a transmitter 175, a transmit/receive antenna 135, a processor 155, a memory 160, a receiver 140, a symbol demodulator 145, and an Rx data processor 150. While FIG. 1 shows that the BS 105 and the MS 110 respectively include the transmit/receive antennas 130 and 135, the BS 105 and the MS 110 may include a plurality of transmit/receive antennas. Accordingly, the BS 105 and the MS 110 according to the present invention support a MIMO (Multiple Input Multiple Output) system. The BS 105 according to the present invention can support both SU-MIMO (Single User-MIMO) and MU-MIMO (Multi-User-MIMO).

On downlink, the Tx data processor 115 receives traffic data, formats the received traffic data, codes the formatted traffic data, and interleaves and modulates (or symbol-maps) the coded traffic data to provide modulated symbols ("data symbols"). The symbol modulator 120 receives and processes the data symbols and pilot symbols to provide a symbol stream.

The symbol modulator 120 multiplexes the data symbols and pilot symbols and transmits the multiplexed data and pilot symbols to the transmitter 125. Here, each transmitted symbol may be a data symbol, a pilot symbol or a null signal value. In each symbol period, pilot symbols may be consecutively transmitted. The pilot symbols may be FDM (Frequency Division Multiplex), OFDM (Orthogonal Frequency Division Multiplex), TDM (Time Division Multiplex) or CDM (Code Division Multiplex) symbols.

The transmitter 125 receives the symbol stream, converts the symbol stream into one or more analog signals and additionally controls (e.g. amplifies, filters and frequency-upconverts) the analog signals to generate a downlink signal suitable for transmission through a radio channel. Then, the transmit antenna 130 transmits the downlink signal to the MS.

In the configuration of the MS 110, the receive antenna 135 receives the downlink signal from the BS and provides the received downlink signal to the receiver 140. The receiver 140 adjusts (e.g. filters, amplifies and frequency-downconverts) the received signal and digitizes the adjusted signal to acquire samples. The symbol demodulator 145 demodulates received pilot symbols and provides the demodulated pilot symbols to the processor 155 for channel estimation.

In addition, the symbol demodulator 145 receives a frequency response estimate for downlink from the processor 155, demodulates received data symbols to acquire data symbol estimates (estimates of the transmitted data symbols) and provides the data symbol estimates to the Rx data processor 150. The Rx data processor 150 demodulates (i.e., symbol-demaps), deinterleaves and decodes the data symbol estimates to restore the transmitted traffic data.

Processing according to the symbol demodulator 145 and the data processor 150 and processing according to the symbol modulator 120 and the Tx data processor 115 of the BS 105 are complementary.

On uplink, the Tx data processor 165 of the MS 110 processes traffic data to provide data symbols. The symbol modulator 170 receives the data symbols, multiplexes the data symbols, modulates the multiplexed data symbols and provides a symbol stream to the transmitter 175. The transmitter 175 receives the symbol stream and processes the received symbol stream to generate an uplink signal. The transmit antenna 135 transmits the uplink signal to the BS 105.

In the BS 105, the uplink signal is received through the receive antenna 130 from the MS 110 and the receiver 190 processes the received uplink signal to acquire samples. The symbol demodulator 195 processes the samples to provide pilot symbols received for the uplink and data symbol estimates. The Rx data processor 197 processes the data symbol estimates to restore the traffic data transmitted from the MS 110.

The processor 155 of the MS 110 and the process 180 of the BS 105 direct (e.g. control, adjust, manage, etc.) operations of the MS 110 and the BS 105. The processors 155 and 180 can be respectively connected to the memories 160 and 185 that store program codes and data. The memories 160 and 185 are respectively connected to the processors 155 and 180 and store operating systems, applications and general files.

The processors 155 and 180 can be called controllers, microcontrollers, microprocessors, microcomputers, etc. The processors 155 and 180 may be implemented by hardware, firmware, software, or combinations thereof. When the embodiments of the present invention are implemented using hardware, ASICs (Application Specific Integrated Circuits), DSPs (Digital Signal Processors), DSPDs (Digital Signal Processing Devices), PLDs (Programmable Logic Devices) or FPGAs (Field Programmable Gate Arrays) configured to implement the present invention may be included in the processors 155 and 180.

In a firmware or software configuration, the embodiments of the present invention may be implemented in the form of a module, a procedure, a function, etc. Firmware or software configured to implement the present invention may be included in the processors 155 and 180 or stored in the memories 160 and 185 and executed by the processors 155 and 180.

Layers of a wireless interface protocol between the MS and the BS and a wireless communication system (network) can be classified into a first layer (L1), a second layer (L2) and a third layer (L3) on the basis of lower three layers of the OSI (Open System Interconnection) model well-known in communication systems. A physical layer belongs to the first layer and provides an information transmission service through a physical channel. An RRC (Radio Resource Control) layer corresponds to the third layer and provides control radio resources between the MS and the network. The MS and the BS can exchange RRC messages through a wireless communication network and the RRC layer.

A description will be given of a method for determining uplink transmission power by a mobile station using Equation 1 in IEEE 802.16m system corresponding to a mobile communication system. The mobile station needs to determine an uplink transmission power value when transmitting an uplink signal.

$$P(\text{dBm}) = L + SINR_{Target} + NI + \text{Offset} \qquad [\text{Equation 1}]$$

Here, P denotes a transmit power level (dBm) per subcarrier and stream for current transmission and L represents a current average downlink propagation loss estimated by the MS. L includes a Tx antenna gain and path loss of the MS. $SINR_{Target}$ is a target uplink SINR (Signal to Interference plus Nose Ratio) received by the MS from the BS. NI is average noise and interference level (dBm) per subcarrier, estimated by the BS, and is received by the MS from the BS. Offset is a correction term for power offset per MS. An offset value is transmitted from the BS through a power control message.

There are two offset values Offsetdata, used for data transmission, and Offsetcontrol, used for control information transmission.

In the case of a control channel on which control information is transmitted, the processor 155 of the MS can apply a target SINR corresponding to the control channel to Equation 1 using Table 1.

TABLE 1

| Control Channel Type | $SINR_{Target}$ Parameters |
|---|---|
| HARQ Feedback | targetHarqSinr |
| Synchronized Ranging | targetSyncRangingSinr |
| P-FBCH | targetPfbchSinr |
| S-FBCH | targetSfbchBaseSinr |
|  | targetSfbchDeltaSinr |
| Bandwidth Request | targetBwRequestSinr |

However, when the MS determines an uplink transmission power value for data transmission, the target SINR needs to be set using Equation 2.

$$SINR_{Target} = 10\log10\left(\max\left(10^{\wedge}\left(\frac{SINR_{MIN}(dB)}{10}\right), \gamma_{IoT} \times SIR_{DL} - \alpha\right)\right) - \beta \times 10\log10(TNS)$$ [Equation 2]

Here, $SINR_{MIN}(dB)$ is a minimum requirement SINR expected by the BS and is set through a unicast power control message. $SINR_{MIN}$ is represented by 4 bits and can have one of values {-∞, -3, -2.5, -1, 0, 0.5, 1, 1.5, 2, 2.5, 3, 3.5, 4, 4.5}. SIRDL denotes a downlink signal to interference power ratio measured by the MS.

In addition, γIoT is a fairness and IoT control factor and is broadcast by the BS to the MS. Alpha(α) is a factor according to the number of Rx antennas in the BS and is signaled as 3 bits through MAC power control mode signaling. In this case, Alpha(α) can be represented as {1, ½, ¼, ⅛, 1/16, 0}, for example. Beta(β) can be set to 0 or 1 through MAC power control mode signaling.

TNS denotes the number of streams in an LRU (Logical Resource Unit) indicated by a UL-A-MAP IE. In the case of SU-MIMO, TNS is set to Mt which denotes the number of streams per user. CSM is set to TNS and denotes the total number of streams. In the case of control channel transmission, CSM can be set to 1.

In this manner, the processor 155 of the MS can determine uplink transmission power using L, NI, offset and $SINR_{Target}$.

As described above, an offset value used by the mobile station to determine uplink transmission power for data channel transmission is a parameter $offset_{data}$ and an offset value used to determine uplink transmission power for control channel transmission is a parameter $offset_{control}$. The parameters $offset_{data}$ and $offset_{control}$ can be included in an AAI-UL-POWER-ADJ message and transmitted to each mobile station by the base station. Table 2 shows some fields of the AAI-UL-POWER-ADJ message in IEEE 802.16m system.

TABLE 2

| Field | Size (bit) | Value/notes | Condition |
|---|---|---|---|
| $offset_{data}$ | 6 | OffsetData is a transmit power adjustment value transmitted from a base station and is represented by steps of 0.5 dB in the range of -15.5 dB to 16 dB. | N/A |
| $offset_{control}$ | 6 | OffsetControl is a transmit power adjustment value transmitted from a base station and is represented by steps of 0.5 dB in the range of -15.5 dB to 16 dB. | N/A |

Referring to Table 2, the base station can transmit a 6-bit parameter $offset_{data}$ and a 6-bit parameter $offset_{control}$ to the mobile station. The parameter $offset_{data}$ is a transmission power adjustment value used for data channel transmission and the parameter $offset_{control}$ is a transmission power adjustment value for control channel transmission. The two values are represented by steps of 0.5 dB in the range of -15.5 dB to 16 dB.

For data channel transmission, the processor 155 of the mobile station can determine the uplink transmission power value through Equation 1 by applying the parameter $offset_{data}$ received through the AAI-UL-POWER-ADJ message from the base station to the term Offset of Equation 1. For control channel transmission, the processor 155 of the mobile station can determine the uplink transmission power value through Equation 1 by applying the parameter $offset_{control}$ received through the AAI-UL-POWER-ADJ message from the base station to the term Offset of Equation 1.

As described above, the base station can transmit the parameter $offset_{data}$ used for data channel transmission and the parameter $offset_{control}$ used for control channel transmission through the AAI-UL-POWER-ADJ message to the mobile station. In this case, the mobile station can receive the parameters $offset_{data}$ and $offset_{control}$ through the latest AAI-UL-POWER-ADJ message ahead of the first uplink subframe of a frame by $T_{DL\_Rx\_Processing}$. Here, $T_{DL\_Rx\_Processing}$ denotes a time necessary for the mobile station to process data burst reception.

As described above, the processor 155 of the mobile station can receive offset values for data channel transmission and control channel transmission through an AAI-UL-POWER-ADJ message and determine the uplink transmission power value for data channel transmission and the uplink transmission power value for control channel transmission by applying the offset values to the offset term of Equation 1.

The processor 155 of the mobile station needs to set an initial value of the parameter $offset_{data}$ to $offset_{initial}$ in order to determine the uplink transmission power value for initial (or first) data channel transmission after successful initial ranging. Here, $offset_{initial}$ is a value calculated by the mobile station during initial ranging. In addition, the processor 155 of the mobile station needs to set an initial value of the parameter $offset_{control}$ for initial control channel transmission after successful initial ranging to the sum of the parameter $offset_{initial}$ and the parameter $offset_{control}$. Here, $offset_{initial}$ is a value calculated by the processor 155 of the mobile station during initial ranging, as described above, and $offset_{control}$ is a value transmitted from the base station to the mobile station through a CDMA allocation A-MAP IE message. The parameter $offset_{control}$ is a transmission power adjustment value for control channel transmission and is represented by steps of 0.5 dB in the range of -15.5 dB to 16 dB. The processor 155 of the mobile station can initialize the parameter $offset_{control}$ to 0 before initial ranging.

The base station can transmit a power correction value through a PC-A-MAP IE message to the mobile station such that the mobile station changes transmission power. Table 3 shows a PC-A-MAP IE message format.

TABLE 3

| Syntax | Size (bit) | Notes |
| --- | --- | --- |
| PC-A-MAP IE format { | | |
| Power correction value | 2 | |
| } | | 0b00 = −0.5 dB |
| | | 0b01 = 0.0 dB |
| | | 0b10 = 0.5 dB |
| | | 0b11 = 1 dB |

Referring to Table 3, the PC-A-MAP IE message includes a 2-bit power correction value. The base station can signal one of −0.5 dB, 0 dB, 0.5 dB and 1 dB as a power correction value to the mobile station. When the mobile station receives the PC-A-MAP IE message from the base station, the processor 155 of the mobile station can change the parameter offset$_{control}$ as represented by Equation 3.

$$\text{Offset}_{Control} = \text{Offset}_{Control} + \Delta_{PowerAdjust} \quad [\text{Equation 3}]$$

Here, $\Delta_{PowerAdjust}$ may be one of the power correction values shown in Table 3, received through the PC-A-MAP IE message from the base station. The value of the parameter offset$_{control}$, received through an AAI-UL-POWER-ADJ message by the mobile station in an i-th frame, can be replaced by a value of the parameter offset$_{control}$, indicated by an AAI-UL-POWER-ADJ message from an (i+1)th frame. The value of the parameter offset$_{control}$ replaced in the (i+1)th frame is valid for a PC-A-MAP IE message from the (i+1)th frame.

A description will be given of an initial ranging process performed by the mobile station and a method for determining the uplink transmission power value for initial data transmission after successful initial ranging.

Figure 2:
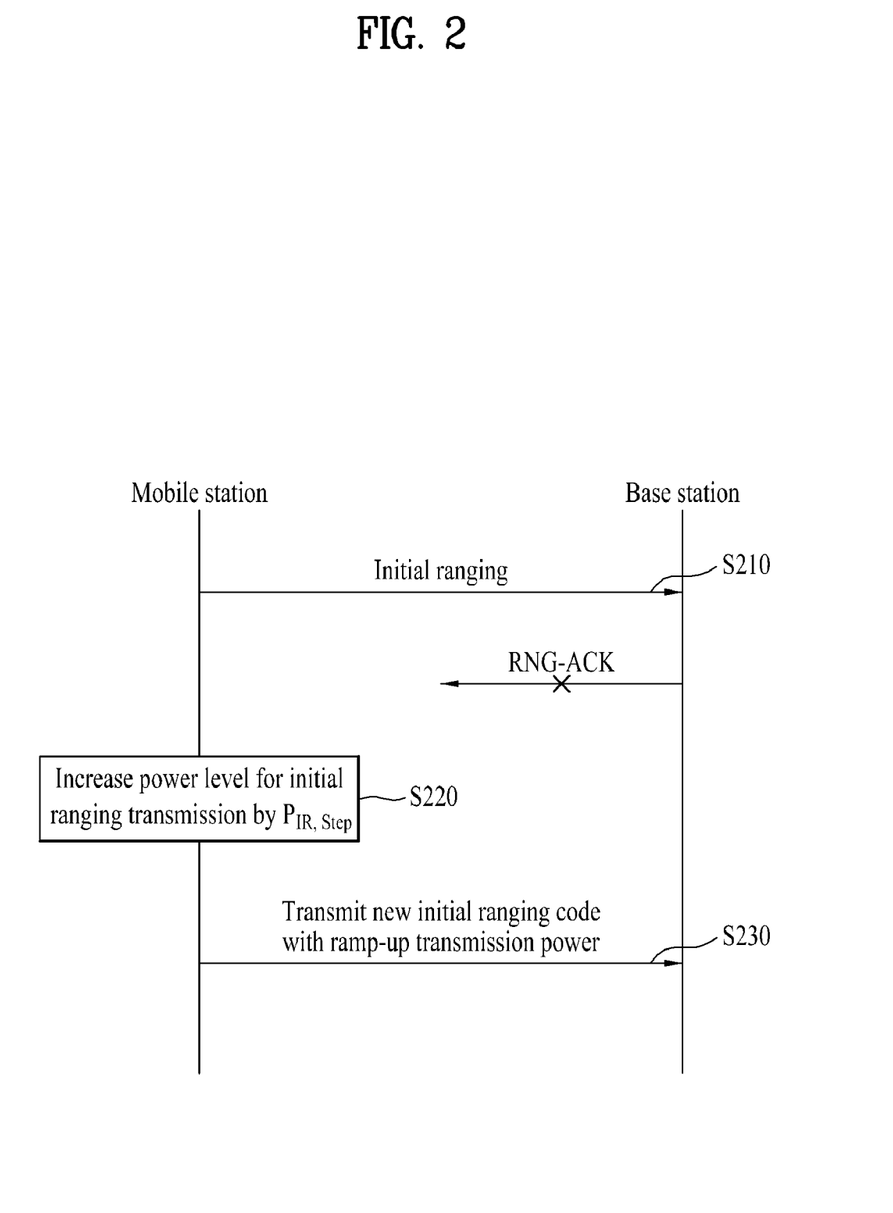
FIG. 2 illustrates a process of performing initial ranging by a mobile station in IEEE 802.16m system.

FIG. 2 shows an initial ranging process performed by the mobile station in an IEEE 802.16m system.

Referring to FIG. 2, for initial ranging, the mobile station can transmit an initial ranging code on an arbitrarily selected ranging channel to the base station (S210). Initial transmission power is determined by measured RSS. When the mobile station does not receive an RNG-ACK response from the base station, the mobile station can increase a power level for initial ranging transmission by P$_{IR,step}$ (S220). Then, the mobile station can transmit a new initial ranging code to the base station with ramped-up transmission power (S230).

Here, P$_{IR,step}$ is a scale at which transmit power ramp-up is performed whenever the mobile station fails in an attempt to perform initial ranging and can be 2 dB, for example. The processor 155 of the mobile station can increase the transmission power up to maximum transmission power for successful initial ranging. Initial ranging transmission power of the mobile station can be calculated according to Equation 4.

$$P_{TX\_IR\_MIN} = EIRxP_{IR,min} + BS\_EIRP - RSS \quad [\text{Equation 4}]$$

Here, EIRxP$_{IR,min}$ is a minimum target reception power and BS_EIRP is transmission power of the base station, which can be received by the mobile station through S-SFH (Secondary-SuperFrame Header) SP2 (SubPacket2) and SP1 (SubPacket1) from the base station. RSS denotes received signal strength measured by the mobile station.

If the mobile station transmits the initial ranging code to the base station with the transmission power determined by Equation 4 and receives an RNG-ACK message for a continue mode without power adjustment (power level adjustment indication bit is 0) from the base station as a response to initial ranging code transmission, the mobile station can use the latest ranging transmission power as an initial transmit power level for following ranging transmission. However, when the mobile station does not receive an RNG-ACK message from the base station within a predetermined time, the processor 155 of the mobile station can ramp up transmission power for following ranging transmission.

If the mobile station receives an RNG-ACK message for a continue mode with power adjustment (power level adjustment indication bit is 1) from the base station as a response to ranging code transmission, transmission power for the continue mode can be based on the latest ranging transmit power and the processor 155 of the mobile station can adjust the transmission power using the value of a power level adjustment field of the RNG-ACK message.

The latest ranging transmission power can be used as an initial transmission power level for following ranging transmission. However, when the mobile station does not receive an RNG-ACK message from the base station within a predetermined time, the processor 155 of the mobile station can ramp up the transmission power for following ranging transmission. The RNG-ACK message can include a 4-bit power level adjustment field, for example. The power level adjustment field indicates a power level adjustment value to be applied by the mobile station to the current transmission power for initial ranging as a multiple of 1 dB. The processor 155 of the mobile station can adjust the power level using the value indicated by the power level adjustment field and use the adjusted power level as a power level for the following ranging transmission.

When the mobile station successfully performs initial ranging according to N power ramp-up operations and M RNG-ACK reception operations, the processor 155 of the mobile station needs to determine the parameter offset$_{initial}$. The processor 155 of the mobile station can determine the parameter offset$_{initial}$ using Equation 5.

$$\text{Offset}_{Initial} = P_{TX\_IR\_Final} - (L + SINR_{InitialRanging} + NI) - 10 \log 10(\text{RangingSubcarrierNum}) \quad [\text{Equation 5}]$$

Here, L denotes current average downlink propagation loss estimated by the mobile station. L includes a transmission antenna gain of the mobile station and path loss. NI denotes average noise and interference level (dBm) per subcarrier, estimated by the base station, and is received by the mobile station from the base station. To determine the parameter offset$_{initial}$ using Equation 5, the processor 155 of the mobile station needs to calculate P$_{TX\_IR\_Final}$, RangingSubcarrierNum and SINR$_{InitialRanging}$ in advance in addition to the downlink propagation loss.

Here, SINR$_{InitialRanging}$ can be represented by Equation 6.

$$SINR_{InitialRanging} = \text{offsetControl} + \text{targetInitialRangingSinr} \quad [\text{Equation 6}]$$

In Equation 6, offsetControl is a value signaled by the base station to the mobile station through a CDMA allocation a-MAP IE message, and targetInitialRangingSinr is a default value of initial ranging target SINR. Table 4 shows default values of uplink power control parameters including targetInitialRangingSinr.

TABLE 4

| Type | Parameters | Default value |
| --- | --- | --- |
| Data Channel Control Parameters | Alpha | ½ |
| | Beta | 0 |
| | Gamma | 0.5 |

TABLE 4-continued

| Type | Parameters | Default value |
|---|---|---|
| | dataSinrMin | 3 dB |
| | dataSinrMax | 40 dB |
| Control Channel Target SINR Value | targetHarqSinr | 2 dB |
| | targetInitialRangingSinr | 0 dB |
| | targetSyncRangingSinr | −3 dB |
| | targetPfbchSinr | 0 dB |
| | targetSfbchBaseSinr | 1.5 dB |
| | targetSfbchDeltaSinr | 0.24 dB |
| | targetBwRequestSinr | 0.5 dB |
| Offset Initialization | offsetData | 0 |

Referring to Table 4, targetInitialRangingSinr is set to 0 dB. The values of the uplink power control parameters including targetInitialRangingSinr are preset and known to the mobile station. The mobile station can calculate $SINR_{InitialRanging}$ by summing offsetControl received through the CDMA allocation A-MAP IE message from the base station and targetInitialRangingSinr set to a default value.

The processor 155 of the mobile station needs to determine RangingSubcarrierNum. In Equation 5, RangingSubcarrierNum denotes the number of initial ranging subcarriers. That is, RangingSubcarrierNum is the number of subcarriers allocated for ranging. Subcarrier spacing of a ranging channel in IEEE 802.16m may be different from normal subcarrier (that is, subcarrier for data transmission) spacing. Accordingly, the subcarrier spacing of the ranging channel can be represented by 1/S of the normal subcarrier spacing. In general, the subcarrier spacing of the ranging channel is narrower than the subcarrier spacing for data transmission.

Ranging channels include a non-synchronized ranging channel (NS-RCH) and a synchronized ranging channel (S-RCH). Ranging channels have different structures according to types thereof.

Figure 3:
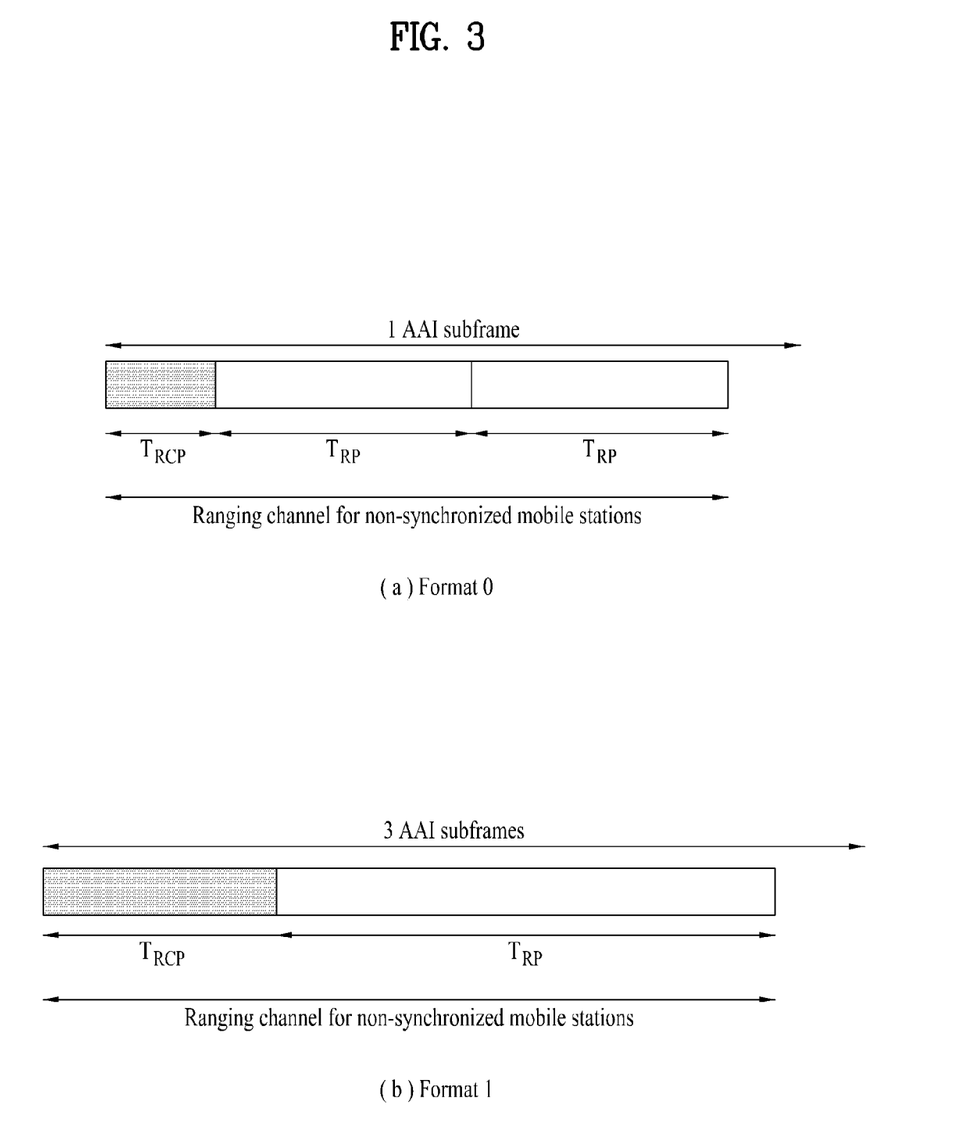
FIG. 3 shows NS-RCH formats in IEEE 802.16m system.

FIG. 3 shows S-RCH formats in IEEE 802.16m.

S-RCH is used for periodic ranging, and a mobile station which has been synchronized with a target base station to which the mobile station will be handed over is permitted to transmit a periodic ranging signal. The physical structure of S-RCH includes 6 OFDMA symbols starting from the first OFDMA symbol in a subframe and 72 subcarriers. The 6 OFDMA symbols have 2 repeated signal waveforms. Each signal waveform as a basic unit is generated over 3 OFDMA symbols and 72 subcarriers according to a ranging preamble code.

Figure 4:
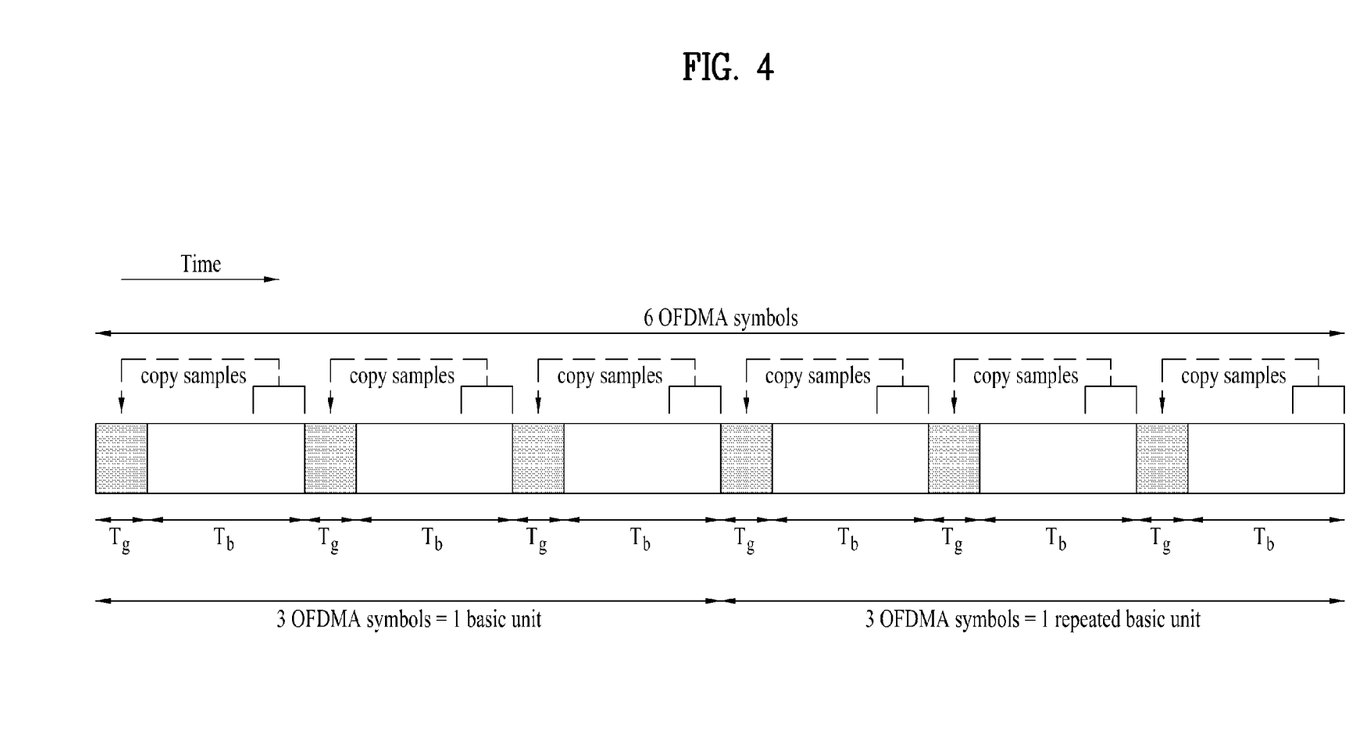
FIG. 4 shows an S-RCH format in IEEE 802.16m system.

FIG. 4 shows an NS-RCH format in IEEE 802.16m system.

NS-RCH is used for the mobile station to perform initial access, handover, ranging and negotiation for a target base station during handover. As shown in FIG. 4, a physical NS-RCH is composed of a ranging preamble (RP) having a length of $T_{RP}$ and a ranging cycle prefix (RCP) having a length of $T_{RCP}$ according to ranging subcarrier spacing $\Delta f_{RP}$. The physical structure of NR-RCH occupies a localized bandwidth corresponding to one subband. Referring to FIG. 3, NS-RCH format 0 is allocated to one uplink subframe and NS-RCH format 1 is allocated to 3 uplink subframes. Format 0 has a repeated structure, as shown in FIG. 3. NS-RCH has different S values according to formats. NS-RCH transmission start timing is aligned with corresponding uplink subframe start timing of a downlink-synchronized mobile station. For example, subcarrier spacing of NS-RCH can correspond to ½ or ⅛ of subcarrier spacing for data transmission according to format (that is, S=2 or 8). As shown in FIGS. 3 and 4, S-RCH and NS-RCH have different physical structures and types.

A ranging channel in IEEE 802.16m uses a frequency region corresponding to one subband. One subband includes 72 subcarriers. When S is 2, the total number of subcarriers is 144. Among 144 subcarriers, 139 subcarriers are actually used and 5 subcarriers are not used. In this case, the processor 155 of the mobile station allocates power corresponding to 139 subcarriers. When S=8, the number of actually used subcarriers is 557. Accordingly, the processor 155 of the mobile station can calculate $offset_{initial}$ by setting RangingSubcarrierNum that indicates the number of initial ranging subcarriers to 139 or 557. Otherwise, the processor 155 of the mobile station can calculate $offset_{initial}$ by setting RangingSubcarrierNum to 139/2 or 557/8. Here, when RangingSubcarrierNum is represented as a decimal, the decimal can be round up to a whole number using a ceil function or the decimal can be round off to a whole number using a floor function.

Considering that uplink power control (ULPC) is performed at PSD level per subcarrier, the PSD level of $offset_{initial}$ needs to maintain subcarrier spacing of a data channel identical to subcarrier spacing of control channels other than NS-RCH.

If subcarrier spacing of a ranging channel is equal to subcarrier spacing of a data channel, $offset_{initial}$ can correspond to a value obtained by subtracting L+$SINR_{synchRanging}$+NI of a normal subcarrier power level from ranging channel subcarrier power $P_{TX\_IR\_Final}$. Even in this case, however, $offset_{initial}$ for the normal subcarrier can be obtained only when ranging channel subcarrier power is converted into normal subcarrier power and then computation is performed.

The processor 155 of the mobile station needs to calculate $P_{TX\_IR\_Final}$. $P_{TX\_IR\_Final}$ is a final initial ranging transmission power value and can be represented by Equation 7.

$$P_{TX\_IR\_Final} = P_{TX\_IR\_MIN} + N \times P_{IR,Step} + \Sigma P_{RNG-ACK}(m)$$ [Equation 7]

Here, $P_{IR,Step}$ is a scale at which power ramp-up is performed and corresponds to 2 dB, and $P_{RNG-ACK}$ is a power level adjustment value of an m-th (m=1, 2, . . . , M) RNG-ACK message received during ranging. $P_{TX\_IR\_MIN}$ is initial ranging transmission power of the mobile station and is calculated according to Equation 4. The processor 155 of the mobile station can calculate the final initial ranging transmission power value $P_{TX\_IR\_Final}$ using Equation 7.

In this manner, the processor 155 of the mobile station can calculate the initial offset value $offset_{initial}$ for initial data channel transmission using $P_{TX\_IR\_Final}$, $SINR_{InitialRanging}$ and RangingSubcarrierNum. Furthermore, the processor 155 of the mobile station can determine the uplink transmission power value for initial data channel transmission according to Equation 1 by applying the calculated initial offset value $offset_{initial}$ as the offset parameter of Equation 1.

When the mobile station transmits a ranging request message (e.g. AAI-RAN-REQ message) after initial ranging, the mobile station can include the value $offset_{initial}$ in the AAI-RNG-REQ message and transmit the AAI-RNG-REQ message including $offset_{initial}$ to the serving base station. The number of initial ranging attempts of the mobile terminal is limited. Accordingly, the mobile station resets $offset_{initial}$ to 0 or an arbitrary value when the number of initial ranging attempts exceeds a maximum number of initial ranging attempts. In this situation, the mobile station may attempt to perform initial ranging for the base station for which initial ranging is initially attempted or a different base station.

As described above, the mobile station can calculate an uplink transmission power value for initial data channel transmission after successful initial ranging.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

INDUSTRIAL APPLICABILITY

The above-described device for controlling uplink transmission power for initial data transmission after network entry and the mobile station device therefor can be applied to various mobile communication systems such as IEEE 802.16m, 3GPP LTE, LTE-A, IEEE 802, etc.

The invention claimed is:

1. A method for controlling an uplink transmission power by a mobile station in a wireless communication system, the method comprising:
   determining, by the mobile station after successfully completing an initial ranging process, an initial offset value using a final initial ranging transmission power and a number of initial ranging subcarriers; and
   setting, by the mobile station, the initial offset value to an offset value for an initial data transmission power.

2. The method according to claim 1, wherein the determining of the initial offset value comprises determining the final initial ranging transmission power based on at least one of
   a power value initially used for the initial ranging transmission, a number of power ramp-up operations,
   a scale at which power ramp-up is performed, or
   a power level adjustment value resulting from a predetermined number of ranging response message receptions from the base station.

3. The method according to claim 1, wherein the determining of the initial offset value comprises determining the initial offset value using an initial ranging signal to interference plus noise ratio (SINR).

4. The method according to claim 1, wherein the determining of the initial offset value comprises determining the initial offset value using at least one of a value L corresponding to a transmit antenna gain and a path loss and average of the mobile station and a noise and interference (NI) level per subcarrier estimated by the base station.

5. The method according to claim 1, wherein the initial offset value is calculated by an equation A:

$$\text{Offset}_{Initial} = P_{TX\_IR\_Final} - (L + \text{SINR}_{InitialRanging} + NI) - 10 \log 10(\text{RangingSubcarrierNum}) \quad \text{[Equation A]}$$

wherein $P_{TX\_IR\_Final}$ corresponds to the final initial ranging transmission power, RangingSubcarrierNum denotes the number of the initial ranging subcarriers, and $\text{SINR}_{InitialRanging}$ denotes the initial ranging SINR.

6. The method according to claim 1, wherein the final initial ranging transmission power is represented as an equation B:

$$P_{TX\_IR\_Final} = P_{TX\_IR\_MIN} + N \times P_{IR,Step} + \Sigma P_{RNG-ACK}(m) \quad \text{[Equation B]}$$

wherein $P_{IR,Step}$ denotes the scale at which power ramp-up is performed, $P_{RNG-ACK}$ is a power level adjustment value of an m-th (m=1, 2, ..., M) RNG-ACK message received by the mobile station during ranging, and $P_{TX\_IR\_MIN}$ is a power value used for the initial ranging transmission initially performed by the mobile station.

7. The method according to claim 1, wherein the number of the initial ranging subcarriers is varied according to a ranging channel type.

8. The method according to claim 1, wherein the initial offset value is determined as 0 or a predetermined specific value when a number of initial ranging attempts exceed a predetermined number.

9. The method according to claim 1, wherein the number of the initial ranging subcarriers is 139/2 or 139 when subcarrier spacing of a ranging channel corresponds to ½ of subcarrier spacing for data transmission.

10. The method according to claim 1, wherein the number of the initial ranging subcarriers is 557/8 or 557 when subcarrier spacing of a ranging channel corresponds to ⅛ of subcarrier spacing for data transmission.

11. A mobile station for controlling an uplink transmission power in a wireless communication system, the mobile station comprising:
   a processor configured to:
      after successfully completing an initial ranging process, determine an initial offset value using a final initial ranging transmission power and a number of an initial ranging subcarriers; and
      set the initial offset value to an offset value for an initial data transmission power.

12. The mobile station according to claim 11, wherein the processor determines the initial offset value by determining the final initial ranging transmission power based on at least one of
   a power value initially used for the initial ranging transmission,
   a number of power ramp-up operations, a scale at which power ramp-up is performed, or
   a power level adjustment value resulting from a predetermined number of ranging response message receptions from the base station.

13. The mobile station according to claim 11, wherein the processor determines the initial offset value using an initial ranging signal to interference plus noise ratio (SINR).

14. The mobile station according to claim 11, wherein the processor determines the initial offset value using at least one of a value L corresponding to a transmit antenna gain and path loss and average of the mobile station and noise and interference (NI) level per subcarrier estimated by the base station.

15. The mobile station according to claim 11, wherein the processor calculates the initial offset value by an equation A:

$$\text{Offset}_{Initial} = P_{TX\_IR\_Final} - (L + \text{SINR}_{InitialRanging} + NI) - 10 \log 10(\text{RangingSubcarrierNum}) \quad \text{[Equation A]}$$

wherein $P_{TX\_IR\_Final}$ corresponds to the final initial ranging transmission power, RangingSubcarrierNum denotes the number of the initial subcarriers, and $SINR_{InitialRanging}$ denotes the initial ranging SINR.

\* \* \* \* \*